(12) United States Patent
Shaked

(10) Patent No.: US 11,392,558 B2
(45) Date of Patent: *Jul. 19, 2022

(54) SYSTEM AND METHOD FOR EXTRACTING A STAR SCHEMA FROM TABULAR DATA FOR USE IN A MULTIDIMENSIONAL DATABASE ENVIRONMENT

(71) Applicant: Oracle International Corporation, Redwood Shores, CA (US)

(72) Inventor: Guy Shaked, Be'er Sheva (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,962

(22) Filed: Jun. 22, 2020

(65) Prior Publication Data

US 2020/0320044 A1    Oct. 8, 2020

Related U.S. Application Data

(63) Continuation of application No. 15/332,781, filed on Oct. 24, 2016, now Pat. No. 10,733,155.

(Continued)

(51) Int. Cl.
G06F 16/30 (2019.01)
G06F 16/21 (2019.01)
G06F 16/28 (2019.01)

(52) U.S. Cl.
CPC .......... *G06F 16/211* (2019.01); *G06F 16/283* (2019.01)

(58) Field of Classification Search
CPC ..... G06F 16/211; G06F 16/283; G06F 16/212
(Continued)

(56) References Cited

U.S. PATENT DOCUMENTS 5,574,952 A    11/1996 Brady
5,915,129 A    6/1999 Slivka
(Continued)

FOREIGN PATENT DOCUMENTS

WO    2006136025    12/2006

OTHER PUBLICATIONS

Oracle®, Oracle® Essbase Release 11.1.1, Database Administrator's Guide, Oracle® Enterprise Performance Management System, Copyright © 1996, 2008, 1182 pages.
(Continued)

*Primary Examiner* — Sana A Al-Hashemi
(74) *Attorney, Agent, or Firm* — Tucker Ellis LLP

(57) ABSTRACT

The application describes a system and method for extracting a star schema from tabular data for use in a multidimensional database. The system can receive a tabular data including a plurality of columns, and determine a relationship between each pair of the plurality of columns by analyzing actual values in a plurality of rows for each pair of columns. Based on the determined relationships among the plurality of columns and a type of each column, the system can use a heuristic process to identify a plurality of cube elements from the plurality of columns to construct a star schema. A user interface can be provided to display potential problems of the star schema, and one or more alternative approaches for a user to select to extract a star schema from the tabular data.

20 Claims, 7 Drawing Sheets

Related U.S. Application Data

(60) Provisional application No. 62/245,893, filed on Oct. 23, 2015.

(58) Field of Classification Search
USPC ........ 707/609, 698, 705, 769, 790, 813, 821
See application file for complete search history.

(56) References Cited

U.S. PATENT DOCUMENTS

| | | | |
|---|---|---|---|
| 6,161,105 | A | 12/2000 | Keighan |
| 6,574,720 | B1 | 6/2003 | Hopeman |
| 6,629,102 | B1 | 9/2003 | Malloy |
| 6,766,325 | B1 | 7/2004 | Pasumansky |
| 6,775,675 | B1 | 8/2004 | Nwabueze |
| 6,873,994 | B2 | 3/2005 | Kootale |
| 7,133,876 | B2 | 11/2006 | Roussopoulos |
| 7,392,242 | B1 | 6/2008 | Baccash |
| 8,156,083 | B2 | 4/2012 | Banerjee |
| 8,386,296 | B2 | 2/2013 | Hage |
| 9,483,537 | B1 | 11/2016 | Peters |
| 9,760,571 | B1 | 9/2017 | Ben-Natan |
| 9,892,187 | B2 | 2/2018 | Tsuchida |
| 10,083,195 | B2 | 9/2018 | Zhou |
| 10,318,498 | B2 | 6/2019 | Tran |
| 10,346,435 | B2 | 7/2019 | Walker |
| 10,360,527 | B2 | 7/2019 | Abe |
| 10,467,251 | B2 | 11/2019 | Menon |
| 2002/0029207 | A1 | 3/2002 | Bakalash |
| 2003/0005420 | A1 | 1/2003 | Ghosh |
| 2003/0145004 | A1* | 7/2003 | Egilsson ............... G06F 16/283 |
| 2004/0054858 | A1 | 3/2004 | Chandrasekaran |
| 2005/0262108 | A1 | 11/2005 | Gupta |
| 2006/0010159 | A1 | 1/2006 | Mirchandani |
| 2006/0085742 | A1 | 4/2006 | Harold |
| 2006/0106769 | A1 | 5/2006 | Gibbs |
| 2006/0116859 | A1* | 6/2006 | Legault ................. G06F 16/248 703/22 |
| 2006/0116976 | A1 | 6/2006 | Legault |
| 2006/0271568 | A1 | 11/2006 | Balkir |
| 2007/0027674 | A1 | 2/2007 | Parson |
| 2007/0061344 | A1 | 3/2007 | Dickerman |
| 2007/0088691 | A1 | 4/2007 | Dickerman |
| 2007/0094668 | A1 | 4/2007 | Jacquot |
| 2008/0288524 | A1 | 11/2008 | Dumitru |
| 2009/0030915 | A1 | 1/2009 | Winter |
| 2009/0043730 | A1* | 2/2009 | Lavdas ................. G06F 16/116 |
| 2009/0228430 | A1* | 9/2009 | Berger .................. G06F 16/283 707/999.005 |
| 2009/0248651 | A1 | 10/2009 | Perry |
| 2009/0249125 | A1 | 10/2009 | Bhatawdekar |
| 2009/0276705 | A1 | 11/2009 | Ozdemir |
| 2012/0005153 | A1 | 1/2012 | Ledwich |
| 2012/0109934 | A1 | 5/2012 | Weyerhaeuser |
| 2013/0332221 | A1* | 12/2013 | Fay ................... G06Q 10/06313 705/7.23 |
| 2014/0046920 | A1 | 2/2014 | Shuma |
| 2014/0122413 | A1 | 5/2014 | Presti |
| 2015/0074071 | A1 | 3/2015 | Bogrett |
| 2015/0339369 | A1 | 11/2015 | Rais-Ghasem |
| 2016/0378843 | A1 | 12/2016 | Cherwonka |
| 2017/0116032 | A1 | 4/2017 | Tran |
| 2017/0116215 | A1 | 4/2017 | Ramaiyer |
| 2017/0116227 | A1 | 4/2017 | Shaked |
| 2017/0116281 | A1 | 4/2017 | Roytman |
| 2017/0116290 | A1 | 4/2017 | Reichman |
| 2017/0116308 | A1 | 4/2017 | Alberg |
| 2017/0116309 | A1 | 4/2017 | Menon |
| 2017/0116310 | A1 | 4/2017 | Walker |
| 2017/0116311 | A1 | 4/2017 | Reichman |
| 2017/0116312 | A1 | 4/2017 | Reichman |
| 2017/0116313 | A1 | 4/2017 | Roytman |
| 2017/0193016 | A1* | 7/2017 | Kulkarni ............... G06F 16/288 |
| 2019/0073366 | A1 | 3/2019 | Raimaiyer |
| 2019/0079959 | A1 | 3/2019 | Raimaiyer |
| 2019/0102445 | A1 | 4/2019 | Raimaiyer |
| 2019/0102446 | A1 | 4/2019 | Raimaiyer |
| 2019/0102447 | A1 | 4/2019 | Raimaiyer |
| 2019/0258612 | A1 | 8/2019 | Tran |
| 2019/0286638 | A1 | 9/2019 | Walker |

OTHER PUBLICATIONS

Oracle ©, Oracle Business Intelligence Foundation Suite, Technical Overview, Jan. 2011, © Oracle 2011, 56 pages.

Ankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.

Russakovsky, Alexander; "Hopping over Big Data: Accelerating Ad-hoc OLAP Queries with Grasshopper Algorithms" published Feb. 26, 2015, 30 pages.

Dynamic Flow process definition Nov. 26, 2018, google.com, hllps://www.google.com/search?biw=1920&bih=1076&ei=njv8W_CJD4mizwK_l4gCQ&q=%22dynamic+flow+process%22+definition&oq=%22dynamic+flow+process%22+definition&gs l=psy-ab .3 ... 38876 .39886 .. 40199 ... 0 .0 .. 0. 76.437 .8 ...... 0 .... 1 .. gws-, viz ....... Oi71 j0i7i30j0i30j0i8i30.

Dynamic Flow process OLAP Nov. 26, 2018, google.com, https://www.google.com/search?biw=1920&bih=1076&ei=njv8W_CJD4mizwK_l4gCQ&q=%22dynamic+flow+process%22+definition&oq=%22dynamic+flow+process%22+definition&gs l=psy-ab .3 ... 38876 .39886 .. 40199 ... 0 .0 .. 0. 76.437 .8 ...... 0 .... 1 .. gws-, viz ....... Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

Oracle ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., Oracle, OAC Essbase Hybrid Block Storage Option Performance Tuning, White Paper, Oracle ©, Jun. 11, 2018, 24 pages.

Oracle, Oracle® Cloud, Oracle Cloud Administering Oracle Essbase Cloud, Copyright © 1996, 2016, 632 pages.

Oracle, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189 04, Sep. 2017, Copyright © 1996, 2017, 1044 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Usman, Muhammad et al., "Discovering diverse association rules from multidimensional schema", Expert Systems with Applications, © 2013 Elsevier Ltd., pp. 5975-5996.

Nebot, Victoria et al., "Multidimensional Integrated Ontologies: A Framework for Designing Semantic Data Warehouses", Stefano Spaccapietra et al., Journal on Data Semantics XIII, LNCS 5530, 2009, pp. 1-36.

Oracle, Oracle® Business Intelligence Cloud Service Data Sync, Getting Started, Release 2.2, Sep. 2016, Copyright © 2010, 2016, 6 pages.

Harvey, Rosie et al., Oracle® Cloud, Preparing Data in Oracle Business Intelligence Cloud Service, E64760-07, Feb. 2017, Copyright © 2014, 2017, 282 pages.

Williams, Richard, "Configuring the Data Sync Tool for BI Cloud Service (BICS)", Apr. 24, 2015, 20 pages.

(56) References Cited

OTHER PUBLICATIONS

Oracle, Loading Data with Oracle BI Cloud Service Data Sync, Tutorial, Copyright © 2015, 34 pages.

* cited by examiner

SYSTEM AND METHOD FOR EXTRACTING A STAR SCHEMA FROM TABULAR DATA FOR USE IN A MULTIDIMENSIONAL DATABASE ENVIRONMENT

CLAIM OF PRIORITY

This application is a continuation application of U.S. patent application Ser. No. 15/332,781, filed Oct. 24, 2016 titled "SYSTEM AND METHOD FOR EXTRACTING A STAR SCHEMA FROM TABULAR DATA FOR USE IN A MULTIDIMENSIONAL DATABASE ENVIRONMENT" which application claims the benefit of priority to U.S. Provisional application titled "SYSTEM AND METHOD FOR CONVERTING AN EXCEL SHEET TO A STAR SCHEMA FOR USE IN A MULTIDIMENSIONAL DATABASE", Application No. 62/245,893, filed Oct. 23, 2015, which applications are herein incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to database and data warehousing, and are particularly related to a system and method for extracting a star schema from an excel sheet for use in a multidimensional database.

BACKGROUND

A multidimensional database, for example, Oracle Essbase, is designed for efficient and convenient storage and retrieval of large volumes of data that can be viewed and analyzed from multiple perspectives. Such a multidimensional database can include cubes that logically represent multidimensional data. Cubes can be built from a tabular data stored in a flat file or a database table. Building cubes from a tabular data requires a user or a system to identify relationships and dependencies among columns in the tabular data, so as to extract schemas for the cubes. However, for a tabular data that includes hundreds of columns, identifying a schema for use in building a cube can be a daunting task.

SUMMARY

In accordance with an embodiment, described herein is a system and method for extracting a star schema from tabular data for use in a multidimensional database. The system can receive a tabular data including a plurality of columns, and determine a relationship between each pair of the plurality of columns by analyzing actual values in a plurality of rows for each pair of columns. Based on the determined relationships among the plurality of columns and a type of each column, the system can use a heuristic process to identify a plurality of cube elements from the plurality of columns to construct a star schema. A user interface can be provided to display potential problems of the star schema, and one or more alternative approaches for a user to select to extract a star schema from the tabular data.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
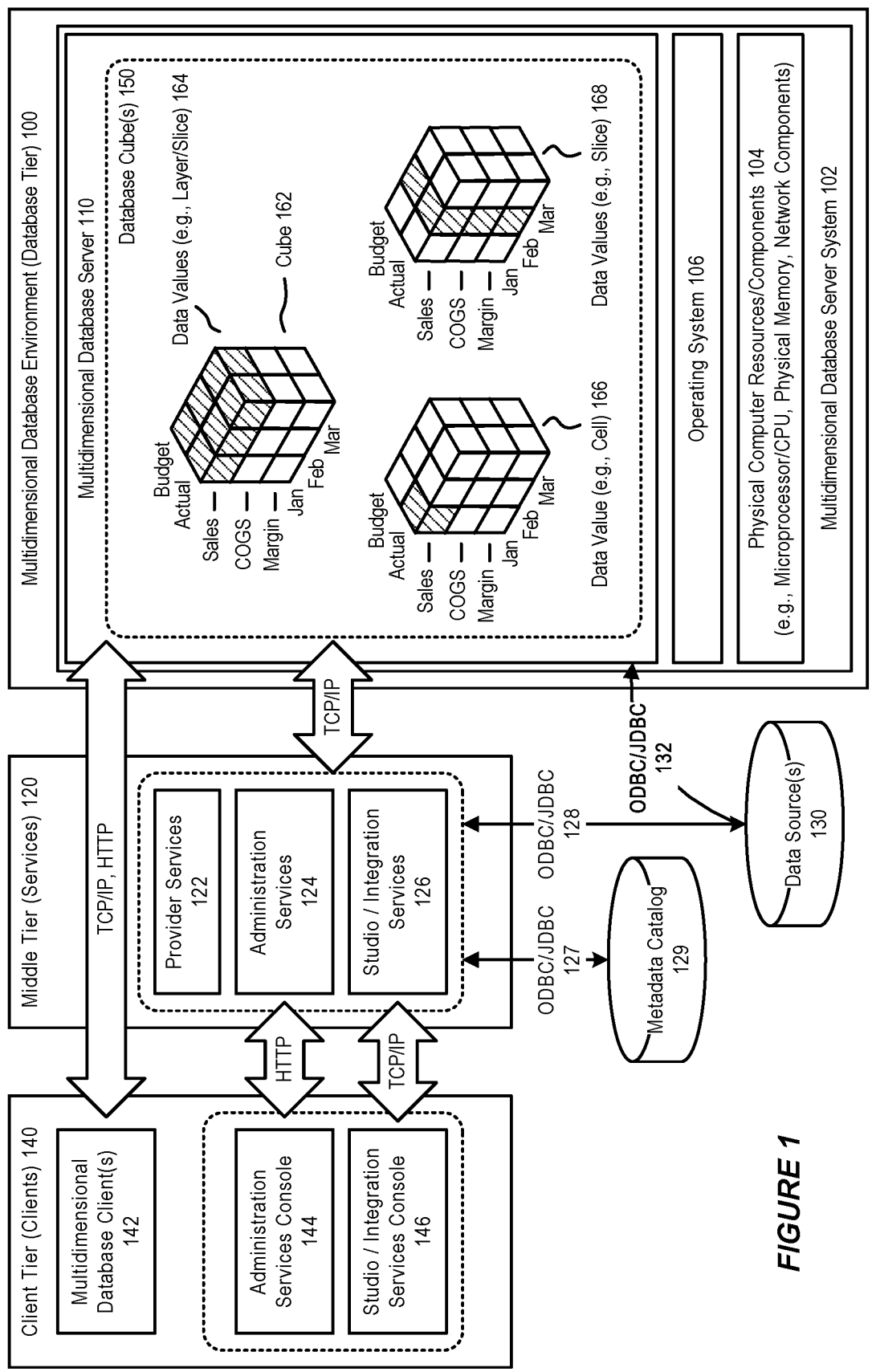
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Conversion of Excel Sheet to Star Schema (5694US1)

A multidimensional database can be used to store data for business planning and forecasting. The data can include legacy data that may be stored in a tabular data format, for example, Excel sheets. To load data in an Excel sheet to a multidimensional database, each column in the Excel sheet needs to be mapped to a star schema in the multidimensional database.

Manually identifying a star schema from an Excel sheet can be time consuming, particularly when the Excel sheet includes a large number of columns, since the columns may be heterogeneously correlated, with many hidden dependencies between the columns.

In accordance with an embodiment, the system described herein can be used to extract a star schema from a tabular data for use in creating a cube in a multidimensional database.

In accordance with an embodiment, the system can receive a tabular data including a plurality of columns, and determine a relationship between each pair of the plurality of columns by analyzing actual values in a plurality of rows for each pair of columns. Based on the determined relationships among the plurality of columns and a type of each column, the system can use a heuristic process to identify a plurality of cube elements from the plurality of columns to construct a star schema. A user interface can be provided to display potential problems of the star schema, and one or more alternative approaches for a user to select to extract a star schema from the tabular data.

In accordance with an embodiment, the system can support different orders of operations when identifying cube elements. For example, the system can identify one or more dimension hierarchies first, and then one or more measure columns, from the plurality of columns; or identify one or more measure columns first, and then one or more dimension hierarchies, from the plurality of columns.

In accordance with an embodiment, the system can support construction of a star schema for a measureless cube. For example, when the Excel sheet does not include a measure column, the system can add a virtual column as a measure column that can hold an arbitrary number, for example, the number "1", in each row of the virtual column and use this column as the measure column. In this case, the actual columns in the excel will be dimension hierarchies and the virtual column will be the measure column.

In accordance with an embodiment, the system can identify relationships between columns in an Excel sheet by analyzing actual values in each cell, determine types of columns, and check statistics and/or properties on each column in the Excel sheet. Based on the determined relationships, types of columns, and statistics and/or properties on each column, a cube construction model can be suggested for use in constructing a star schema.

In accordance with an embodiment, a star schema generated by using the approach described above may not include each column in the Excel sheet, and may also include one or more other errors.

As such, the user interface can be used to display potential problems of the star schema, and one or more alternative approaches (cube construction models) for a user to select to extract a star schema from the Excel sheet.

In accordance with an embodiment, the system can include a star schema generator implemented as a standalone multidimensional database client, or as a component in a multidimensional database client, to the multidimensional database server. The Excel sheet can contain a fully de-normalized information representing a star schema for extraction by the star schema generator.

In accordance with an embodiment, a tabular data can consist of or can be presented in columns; and can refer to data stored in a flat file (for example, an Excel sheet, and a plain text file) or a relational database table.

Although various embodiments of the invention use an Excel sheet as an example, it will be apparent to those skilled in the art that other types of tabular data can be used without limitation.

Heuristic Process

In accordance with an embodiment, a heuristic process can be used to identify cube elements from a plurality of columns in a tabular data (e.g., data stored in an Excel sheet) for constructing a star schema.

Under the heuristic process, one or more cube elements, for example, one or more measure columns and/or one or more flat dimension columns (flat hierarchy dimension columns), that can be identified with high probability, can be identified first and removed from the plurality of columns.

From the remaining columns, more complex cube elements (e.g., columns in a dimension hierarchy) can be identified.

In accordance with an embodiment, a column can be identified as a measure column if the column is a numeric or floating point column, and does not have a relationship (i.e. one-to-one, many-to-one, or one-to-many relationship) with any other column in the plurality of columns.

In accordance with an embodiment, the system can support construction of a star schema for a measureless cube. For example, when an Excel sheet does not include a measure column, the system can add a virtual column as a measure column that can hold an arbitrary number, for example, the number "1", in each row of the virtual column and use this column as the measure column. In this case, the actual columns in the Excel sheet can be dimension hierarchies and the virtual column can be the measure column.

In accordance with an embodiment, a column can be identified as a flat hierarchy dimension column if the column is a text column that does not have a relationship with any other column in the plurality of columns, or the column is a numeric or text column that has a one-to-many or many-to-one relationship with all other columns. A numeric column with no duplicate values can be identified as a flat hierarchy dimension column by default.

In accordance with an embodiment, the remaining columns can include a plurality of dimensions and one or more measure columns. Each dimension can comprise a set of columns of the remaining columns.

In accordance with an embodiment, to create a dimension hierarchy for a dimension, the system can identify a base-level column and one or more top-level columns from the set of columns associated with the dimension.

In accordance with an embodiment, a base-level column can be a column that has only a many-to-one or one-to-one relationship with each other column in a set of columns constituting a dimension. A top-level column can be a column that has a one-to-many relationship or one-to-one relationship with each other column in the set of columns for a dimension. In the set of columns for the dimension, an intermediate column is a column that has a one-to-many with the base-level column, and a many-to-one relationship with the top-level column.

In accordance with an embodiment, a dimension hierarchy can be created using the base-level column, the top-level column, and one or more intermediate columns; and can be added to the one or more flat hierarchy dimension columns. The one or more measure columns, the one or more flat hierarchy dimension columns, and the dimension hierarchy can be used to create a cube schema.

In accordance with an embodiment, when multiple top-level columns are identified for a set of columns in a dimension, a top-level level that can be combined with one or more intermediate level columns and the base-level column to create the highest/longest combination/chain can be selected as the top-level column. The rest of the top-level columns can be identified as attributes, or top-level columns for alternate dimension hierarchies.

In accordance with an embodiment, the highest hierarchy built using the base-level column, the selected top-level column, and the intermediate level columns can be considered the main dimension hierarchy. Columns in the set of columns for the dimension that are not included in the main dimension hierarchy can be identified as attributes of the base-level column.

In accordance with an embodiment, an alternative dimension hierarchy can be identified by repeating the process described above after removing the top-level column and the intermediate level columns. Each alternative dimension hierarchy and the main dimension hierarchy (identified the first time) for a particular dimension can share the same base-level column.

Dimension Hierarchy Identification by Header Names

In accordance with an embodiment, column header names (i.e. cells in a header row) can be used to identify a dimension hierarchy.

For example, the system can search for common vocabulary to identify column designations. A numeric column with a header name "sales" or "revenue" can be identified as a measure column. A numeric column with a header name "Code" or "Id" can be identified as part of dimension.

In accordance with an embodiment, the above-described approach can work on prefixes and postfixes as well. For example, a column with a header name ending with "Id' or "Code" can be identified as a part of a dimension.

In accordance with an embodiment, header names and their designations (measure, dimension, alias or attribute) within a same company can be used on new Excel sheets. For example, if a header name has been designated with a measure column previously, a column with a same or similar header name can be identified as a measure column.

In accordance with an embodiment, when processing a column that contains a global type of information for which a pre-defined dimension hierarchy exists in the system, the system can prompt a user to complete the information from the pre-defined dimension hierarchy.

For example, if the system contains a global dimension hierarchy for dates, the system, upon detecting that a column contains dates, can create a dimension based on the date column to contain all levels of the pre-existing dimension hierarchy. In accordance with an embodiment, virtual columns for Year, Quarter, Month and Day can be created from the data column.

In accordance with an embodiment, upon detecting that a column contains products from a global product dimension, the system can prompt a user to or automatically add parts of a common dimension hierarchy in a cube that has been generated and create virtual columns for product hierarchy as required.

In accordance with an embodiment, the designation of a column can be based on a plurality of factors, including a header name, cell values, and a column type. Each factor can be given a different weight in the designation of the column. For example, if a column has a header name "Sales", but the type of the column is a text, the system can designate or identify the column as a part of a dimension hierarchy that has been identified, although based on the header alone, the column would have been identified as a measure column.

Figure 2:
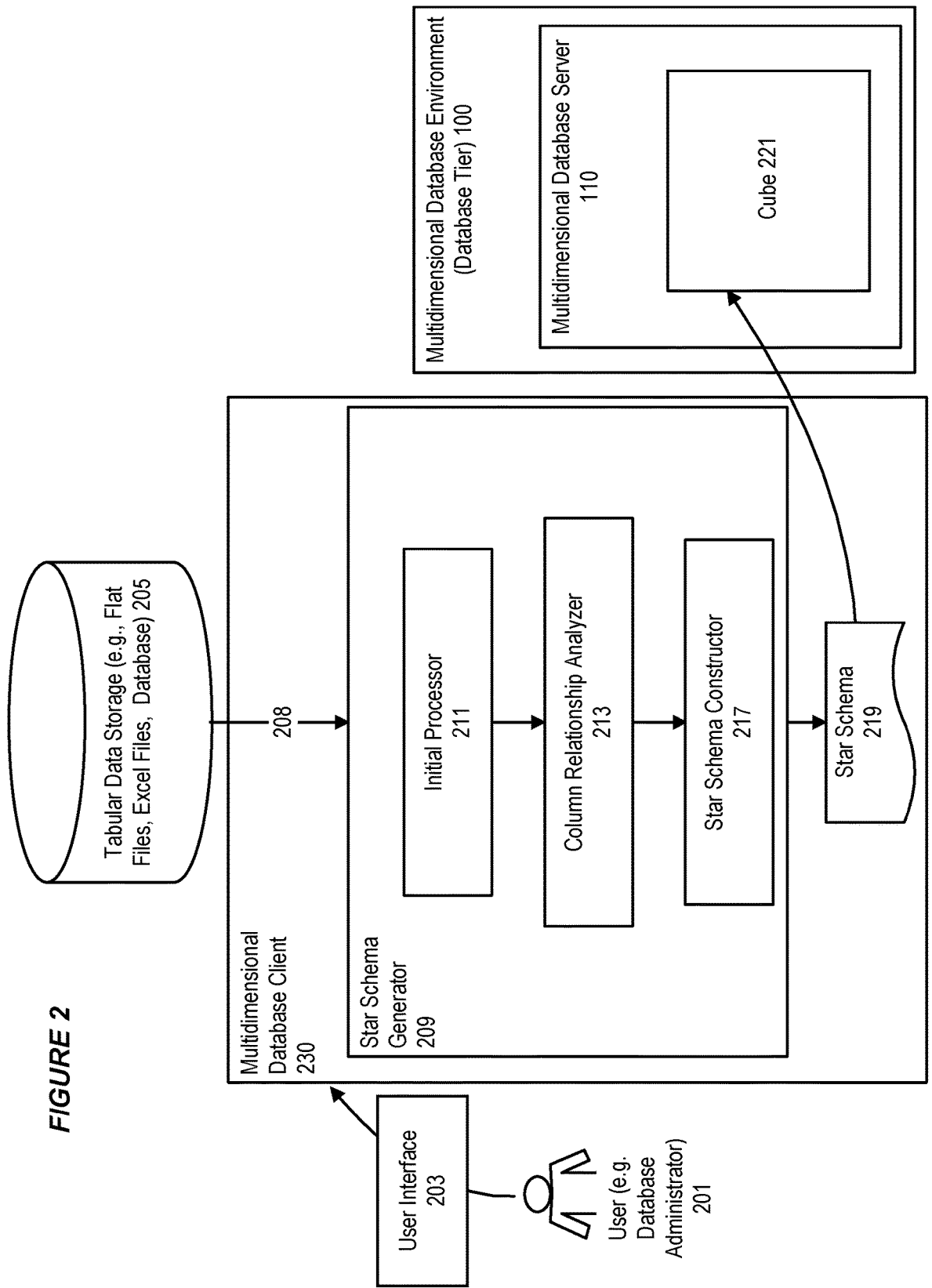
FIG. 2 illustrates a system for extracting a star schema from a tabular data for use in a multidimensional database, in accordance with an embodiment.

FIG. 2 illustrates a system for extracting a star schema from a tabular data for use in a multidimensional database, in accordance with an embodiment.

As shown in FIG. 2, a star schema generator 209 can execute on a multidimensional database client 230 to the multidimensional database server 110 in the multidimensional database environment 100.

Initial Processing

In accordance with an embodiment, the star schema generator can include an initial processor 211 that can receive an Excel sheet 208 from tabular data storage 205 in response to a request from a user 201 received at a user interface 203, and perform preliminary processing of the Excel sheet. The preliminary processing can include filling missing values, handling exceptions in cell values, checking statistics/properties on columns in the Excel sheet, and determining types of columns (for example, numeric, float, or text) in the Excel sheet.

In accordance with an embodiment, the initial processor, when reading the Excel sheet, can complete any missing value in one or more "excel merged" fields. A merged cell can get a value in a first cell in a merged block.

In accordance with an embodiment, the initial processor can detect a merged cell, which can span multiple columns in a row, or can span multiple rows in a column. If the initial processor detects a merged cell spanning multiple rows in a column, the column can be identified as part of a dimension hierarchy. If the initial processor detects a merged cell spanning multiple columns in a row, the row can be skipped in the initial processing.

Similarly, the initial processor can skip a row if it finds in the row a plurality of cells, each cell having one or more cell properties not possessed by cells in a previous row. Cell properties can include font size, font color, font type, border markings, and cell fill color.

Additionally, in accordance with an embodiment, if the initial processor detects a cell with a summary value in a column, the column can be identified as a measure column.

In accordance with an embodiment, the Excel sheet may include abnormal cell values, for example, exceptions and wrong values. Examples of abnormal cell values can include one or more exceptions caused by division by zero ("# DIV/0!"s). The initial processor can process these abnormal values, so that they do not impact the system in determining the type of a column.

For example, when a column contains several "# DIV/0!"s, the system should be able to correctly determine that the column is a numeric column, rather than a text column.

In accordance with an embodiment, the initial processor can check the number of unique values in each column, counting the number of rows. When checking statistics on the columns in the Excel sheet, the initial processor can record those exception columns that have no duplicate values or have a single value; and check how many columns are numeric, float or text.

In accordance with an embodiment, additional statistics and properties can be checked on each column, for example, the size of text in each column, whether all values in a column are positive if the column is numeric, and the numeric range of values in a column. The additional statistics and cell properties can be used in mapping a particular column to an element in a star schema.

For example, large numeric values (not float) in a column can indicate that the column holds identifier information. As such, the column can be mapped to a dimension column in a star schema.

In accordance with an embodiment, the initial processor can also determine types of the columns in the Excel sheet. A column can be determined as a numeric column if the column contains only numeric values, and does not contain float values. A column can be determined as a float column if at least one value in the column is float and all the rest are numeric. A column can be determined as a text column if one or more cell values in the column are text, or all values in the column are date values.

In accordance with an embodiment, for type determination, the initial processor can avoid reading non data rows (e.g. header, trailer, and page change). If non data rows cannot be avoided, values can be set on how many irrelevant fields the system can ignore.

Column Relationships

As further shown in FIG. 2, the initially processed Excel sheet can be passed to a column relationship analyzer 213, which can analyze actual cell values in a plurality of rows for each pair of columns to determine a relationship between each pair of columns.

As an illustrative example, to identify the relationship between Columns $C_i$ and $C_j$, the column relationship analyzer can go over a plurality of rows to determine (a) whether each unique value appearing in multiple rows in Column $C_i$ consistently corresponds to a same value in Column $C_j$; and (b) whether each unique value appearing in multiple rows in Column $C_j$ consistently corresponds to a same value in Column $C_i$.

In accordance with an embodiment, the answers for each pair of columns can be stored in a matrix or a two-dimensional array, where an answer "Yes" can be represented by a correlation indicator, for example, "0", an answer "No" can be represented by an different correlation indicator, for example, "1".

In accordance with an embodiment, the column relationship analyzer can determine a relationship for each pair of columns based on the correlation indicators stored in the matrix or two-dimensional array or another data structure. If the answers for both (a) and (b) are "Yes", the column relationship analyzer can determine that there is a one-to-one relationship between Columns $C_i$ and $C_j$. If only the answer for (a) is "Yes", the column relationship analyzer can determine that there is a many-to-one relationship between Columns $C_i$ and $C_j$ from the perspective of Column $C_i$. If only the answer for (b) is "Yes", the column relationship analyzer can determine that there is a one-to-many relationship between $C_i$ and $C_j$ from the perspective of $C_i$. If the answers for both (a) and (b) are "No", the column relationship analyzer can determine that there is a many-to-many relationship or no relationship between Columns $C_i$ and $C_j$.

In accordance with an embodiment, when analyzing an actual cell value, the column relationship analyzer can examine the string pattern in a cell or a string pattern converted from a value in a cell, and does not analyze the meaning associated with each string pattern.

In accordance with an embodiment, if a particular column has no duplicate values, the column relationship analyzer can determine that the particular column has a many-to-one or one-to-one relationship with each of the other columns, depending on whether the other column in each column pair also has duplicates. If the other column in each column pair also has no duplicate values, the particular column has a one-to-one relationship with the other column in that column pair. Otherwise, if the other column in each column pair has duplicate values, the particular column has a many-to-one relationship with the other column in that column pair.

In accordance with an embodiment, if a particular column contains a single value, the column relationship analyzer can determine that the particular column has a one-to-many or one-to-one relationship with each of the other columns, depending on whether the other column in each column pair also contains a single value. If the other column in each column pair also contains a single value, the particular column has a one-to-one relationship with the other column in that column pair. Otherwise, if the other column in each column pair contains multiple values that are duplicated across rows, the particular column has a many-to-one relationship with the other column in that column pair.

In accordance with an embodiment, when a particular column contains multiple single values (no duplicate value), or contains a single value in each row of the particular column, the particular column can have a relationship (one-to-one, one-to-many, or many-to-one) with all other columns. The column relationship analyzer can mark this particular column as an exception column, and ignore the exception column when analyzing column relationships. That the column has a relationship (other than a many-to-many relationship) with all other columns does not reveal true relationships with other columns, and can instead disrupt the column relationship analyzer from analyzing relationships among other columns.

In accordance with an embodiment, in determining relationships between columns, each pair of columns needs to be tested by checking whether each unique value appearing in multiple rows in one column consistently corresponds to a same value in another column. However, once the relationship between a pair of columns is identified as many-to-many after testing a plurality of rows for the pair of columns, the many-to-many relationship is not to change. As such, there is no need to continue testing additional rows for the column combination.

In accordance with an embodiment, the column relationship analyzer can be executed by a plurality of threads in parallel, with each thread responsible for one of the columns and determining relationships between the column and each of the other columns in the Excel sheet.

As further shown in FIG. 2, the relationships determined among the plurality of columns can be stored in a matrix or a two-dimensional array. A star schema constructor 217 can retrieve the relationships from the matrix or the two-dimensional array, and perform a heuristic process to identify a plurality of cube elements from the plurality of columns based on the retrieved relationships and types of the columns. The star schema constructor can construct a star schema 219 from the plurality of cube elements.

In accordance with an embodiment, the star schema can include metadata that defines the structure of a cube 221 in the multidimensional database server.

Figure 3:
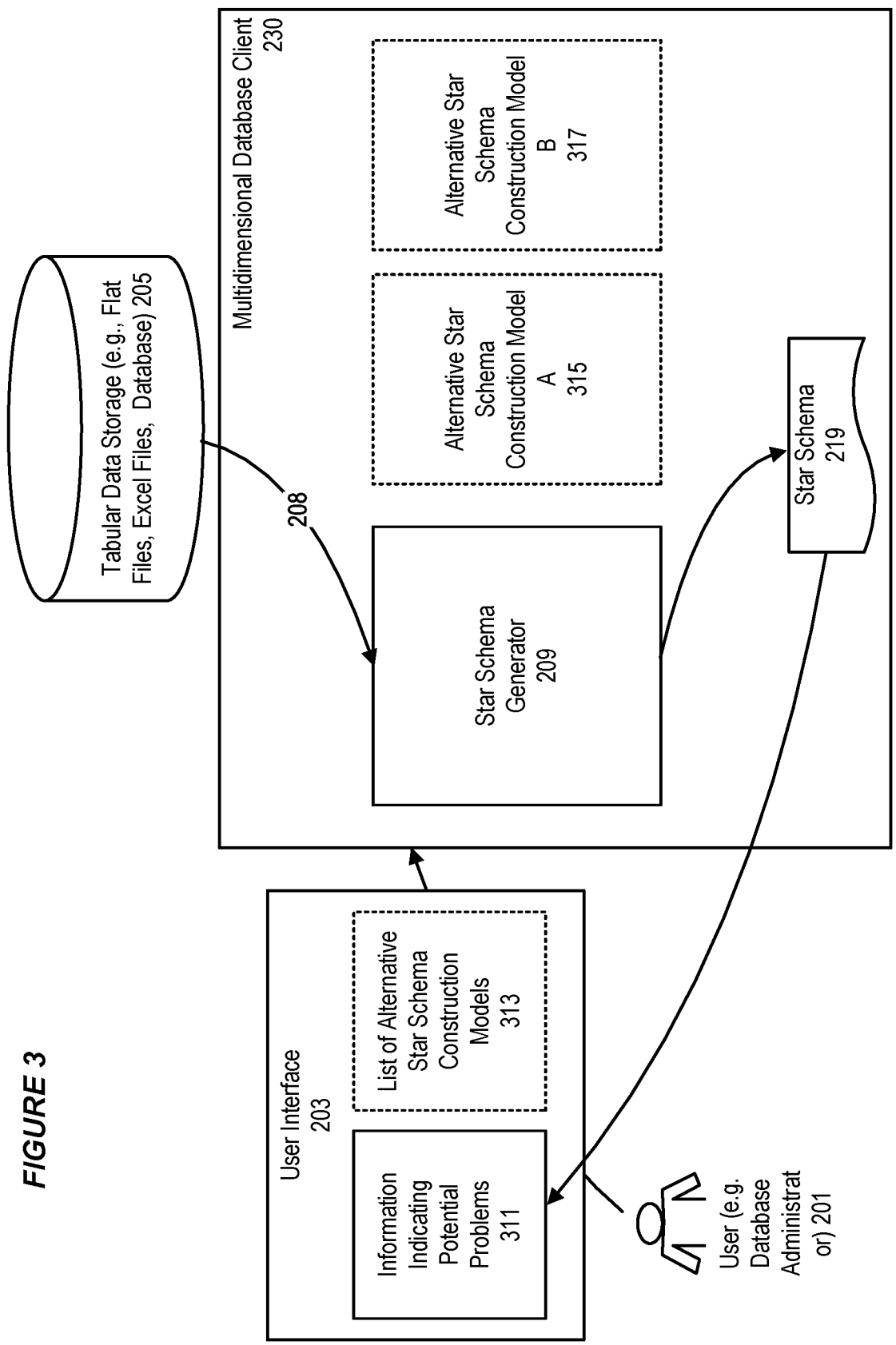
FIG. 3 further illustrates a system for extracting a star schema from a tabular data for use in a multidimensional database, in accordance with an embodiment.

FIG. 3 illustrates a system for extracting a star schema from a tabular data for use in a multidimensional database, in accordance with an embodiment.

As shown in FIG. 3, the star schema generated by the star schema generator may be associated with one or more potential problems. For example, one or more columns of the Excel sheet may be missing in the star schema.

In accordance with an embodiment, information 311 indicating the one or more potential problems can be displayed in the user interface. The displayed information can indicate why the star schema may be incorrect. For example, the information can indicate that a particular column may not be mapped to a correct a cube element in the generated star schema.

As further shown in FIG. 3, the user interface can provide an option for the user to select an alternative cube schema construction model to extract a star schema or another type of schema for building a cube in the multidimensional database.

For example, a list of alternative cube schema construction models 313 can be displayed to allow the user to make a selection.

In accordance with an embodiment, each entry in the list of alternative cube schema construction models can have a corresponding component in the multidimensional database client, for example, an alternative cube schema construction model A 315, and an alternative cube schema construction model B 317. Each corresponding component can represent an implementation of an alternative model, and can be invoked by the user to extract a star schema from the Excel sheet.

For example, the alternative cube schema construction model A can use header name contents in the Excel sheet to determine relationships between each pair of columns in the Excel sheet, and the alternative cube schema construction model B can use cell types or cell properties to obtain additional information on column types. Additional cube schema construction models in the list of alternative cube schema construction models can examine contents on cells to identify information such as time hierarchies.

In accordance with an embodiment, in each of the alternative cube schema construction models, a heuristic process described above can be used to identify a plurality of cube elements from the plurality of columns.

Figure 4A:
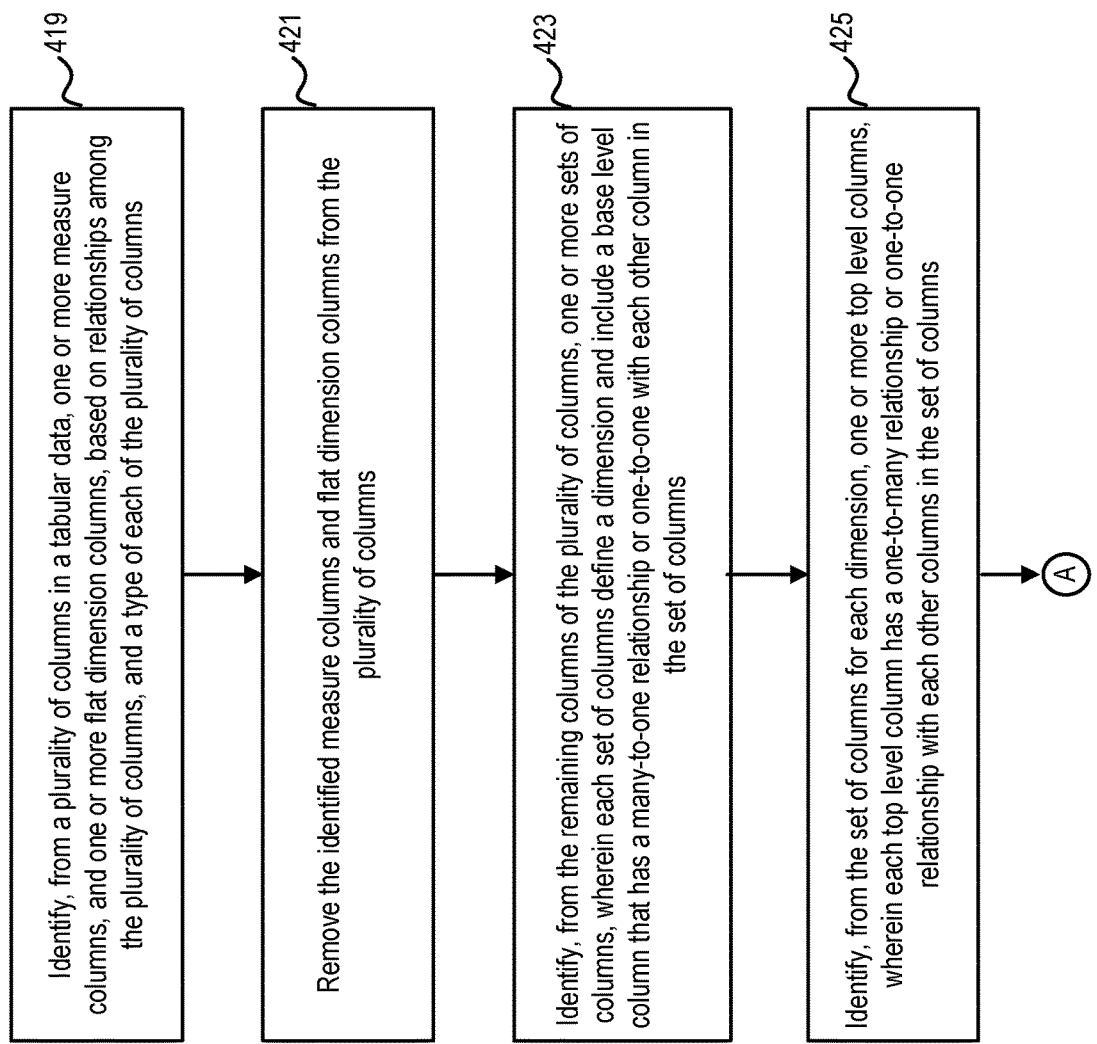
FIGS. 4A-4B illustrate a flow chart for extracting a star schema from a tabular data for use in a multidimensional database, in accordance with an embodiment.
Figure 4B:
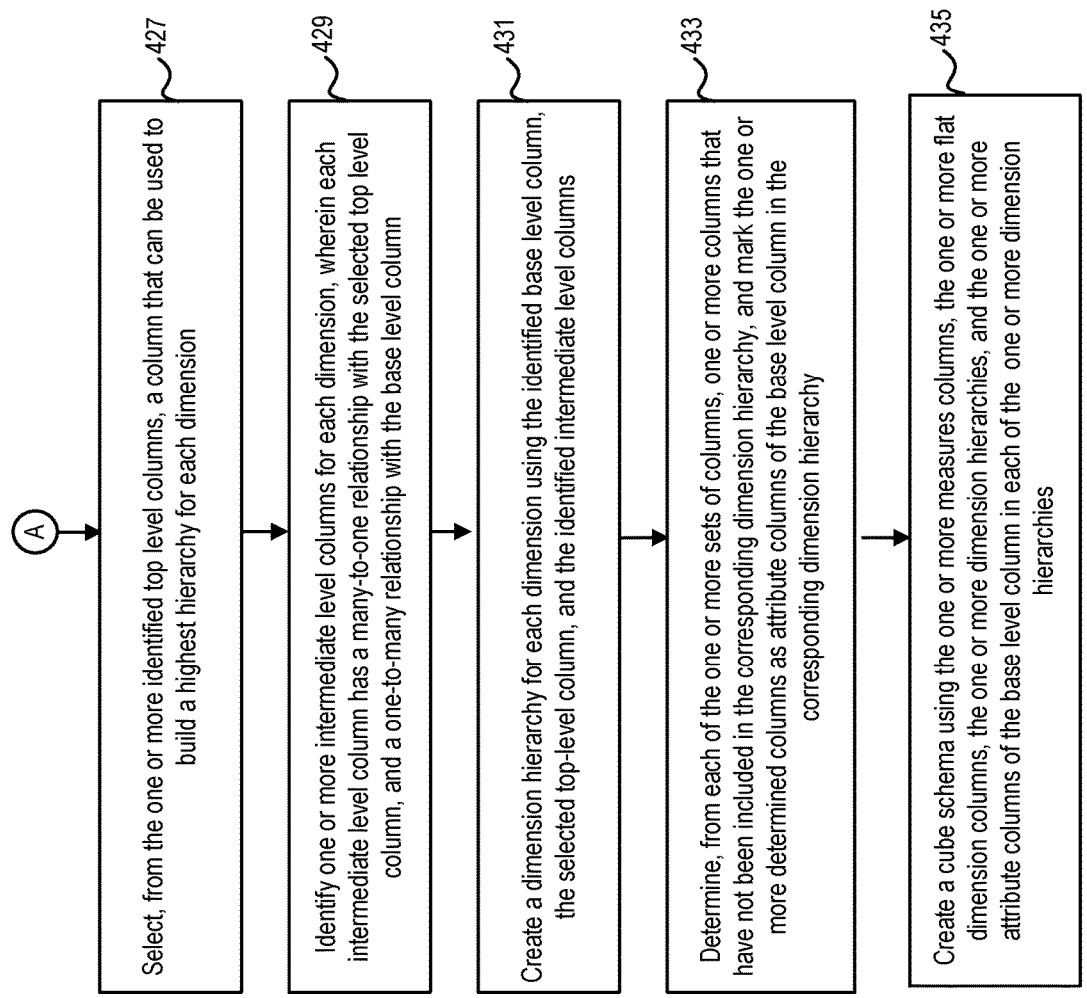

FIGS. 4A-4B illustrate a flow chart for extracting a star schema from a tabular data for use in a multidimensional database, in accordance with an embodiment.

More particularly, FIGS. 4A-4B illustrate an algorithm or a heuristic process that can be used by the star schema constructor to deduce cube elements from a plurality of columns in a tabular data (e.g., data stored in an Excel sheet). The heuristic process or algorithm can be implemented in one or more software components that run as a client to a multidimensional database server.

As shown in FIGS. 4A-4B, at step 419, the star schema generator can identify, from a plurality of columns in a tabular data, one or more measure columns, and one or more flat dimension (flat hierarchy dimension) columns, based on relationships among the plurality of columns and a type of each of the plurality of columns.

In accordance with an embodiment, a column can be identified as a measure column if the column is a numeric or floating point column, and does not have a relationship (i.e. one-to-one, many-to-one, or one-to-many relationship) with any other column in the plurality of columns.

In accordance with an embodiment, if no measure column can be identified using the approach described above, and a numeric column with no duplicate values is available, the numeric column, which is an exception column, can be identified as a measure column.

In accordance with an embodiment, each tabular data can have at least one measure column. When the tabular data does not have a measure column, the star schema generator can add a virtual column to the tabular data, and populate the virtual column with an arbitrary number or aggregated values from each row of the tabular data. For example, each row of the virtual column can be populated with an arbitrary number "1", or an aggregated value that can represent a count for all cells in each row.

In accordance with an embodiment, a column can be identified as a flat hierarchy dimension column if the column is a text column that does not have a relationship with any other column, or the column is a numeric or text column that has a one-to-many or many-to-one relationship with all other columns.

However, when a tabular data (e.g., data stored in an Excel sheet) includes a floating point column that has no relationship with any other column, and a column that has a many-to-one relationship with all other columns except the floating point column, then the floating point column can be identified as a measure column, and each numeric column that does not have a relationship with the floating point column can be identified as a flat hierarchy dimension column.

In accordance with an embodiment, a numeric column with no duplicate values can be identified as a hierarchy dimension column by default.

At step 421, the identified measure columns and the one or more flat hierarchy dimension columns can be removed from the plurality of columns.

At step 423, the star schema generator can identify, from the remaining columns of the plurality of columns, one or more sets of columns, wherein each set of columns define a dimension and include a base-level column that has a many-to-one or one-to-one relationship with each other column in the set of columns.

At step 425, the star schema generator can identify, from the set of columns for each dimension, one or more top-level columns, wherein each top-level column has only a one-to-many or one-to-one with each other column in the set of columns.

At step 427, the star schema generator can select, from the one or more identified top-level columns, a column that can be used to build a highest hierarchy for each dimension.

At step 429, the star schema generator can identify one or more intermediate level columns for each dimension hierarchy, wherein each intermediate level column has a many-to-one relationship and a one-to-many relationship with other columns in the set of columns for each dimension.

At step 431, the star schema generator can create a dimension hierarchy for each dimension using the identified base-level column, the selected top-level column, and the identified intermediate level columns.

At step 433, the star schema generator can determine, from each of the one or more sets of columns, one or more columns that have not been included in the corresponding dimension hierarchy, and mark the one or more determined columns as attribute columns of the base-level column in the corresponding dimension hierarchy. The one or more columns marked as attributes of the base-level column can include any column that has a one-to-one relationship with the base-level column or the selected top-level column, and any unselected top-level column identified above.

At step 435, the star schema generator can create a star schema/cube schema using the one or more measures columns, the one or more dimension hierarchies, and the one or more attribute columns of the base-level column in each of the one or more dimension hierarchies.

Figure 5:
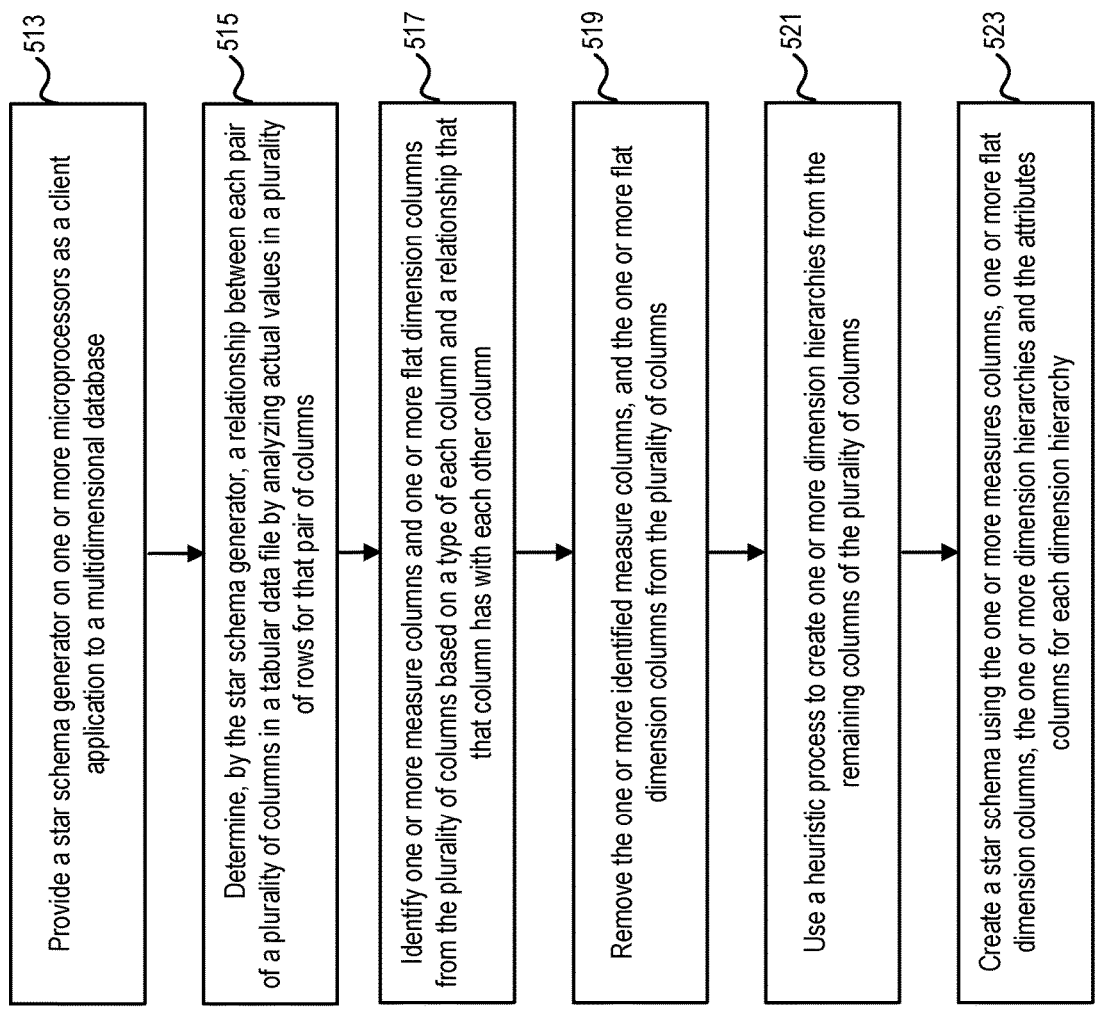
FIG. 5 illustrates a method for extracting a star schema from a tabular data use in a multidimensional database, in accordance with an embodiment.

FIG. 5 illustrates a method for extracting a star schema from a tabular data for use in a multidimensional database, in accordance with an embodiment.

At step 513, a star schema generator is provided on one or more microprocessors, for use in a multidimensional database.

At step 515, the star schema generator operates to determine a relationship between each pair of a plurality of columns in a tabular data by analyzing actual values in a plurality of rows for that pair of columns.

At step 517, the star schema generator operates to identify one or more measure columns and one or more flat hierarchy dimension columns from the plurality of columns based on a type of each column and a relationship that that column has with each other column.

At step 519, the star schema generator removes the one or more identified measure columns, and the one or more flat hierarchy dimension columns from the plurality of columns.

At step 521, the star schema generator creates one or more dimension hierarchies from the remaining columns of the plurality of columns using a heuristic process.

At step 523, the star schema generator constructs a star schema using the one or more identified measure columns and the one or more dimension hierarchies.

Figure 6:
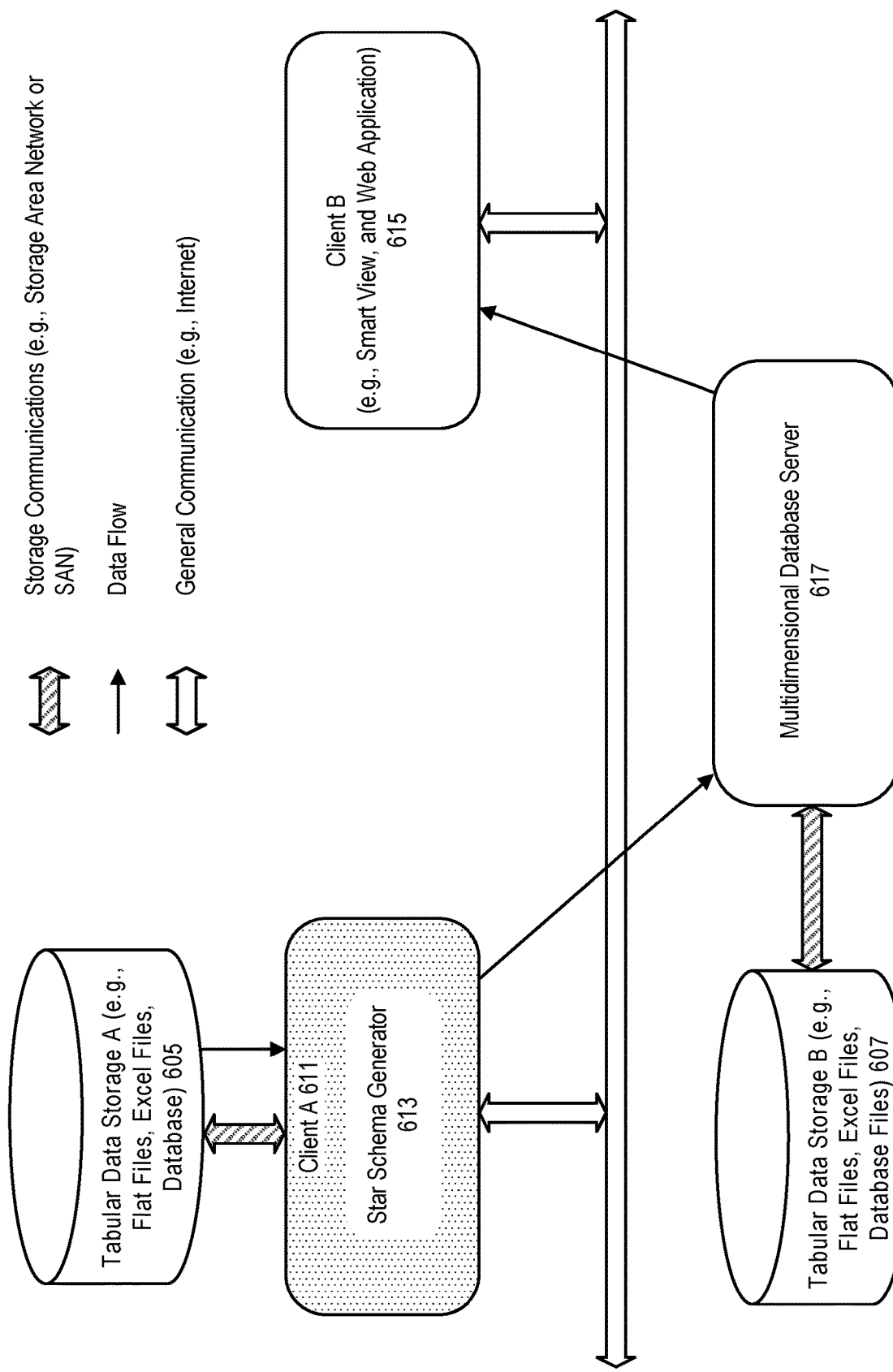
FIG. 6 illustrates an architectural diagram for an environment in which the system can be used, in accordance with an embodiment.

FIG. 6 illustrates an architectural diagram for an environment in which the system can be used, in accordance with an embodiment.

As shown in FIG. 6, the star schema generator 613 can run on a client A 611 to a multidimensional database server 617, extract a star schema from an Excel sheet stored in a tabular data storage A 605, and load the Excel sheet into a cube in the multidimensional database server 617, for access by client B 615.

In accordance with an embodiment, the multidimensional database server can also communicate with a tabular data storage B 607, which can provide tabular data and database files to support the multidimensional database server.

For example, the tabular data and database files can include log files and metadata for Essbase studio.

An Illustrative Example

In accordance with an embodiment, the following example illustrates the system and method described above.

In the example, an Excel sheet is provided to the star schema generator, which can initially process the Excel sheet to determine types of columns in the Excel sheet, determine relationships among the columns based the column types and actual cell values in each column. A heuristic process can be used to identify cube elements, from which a star schema can be created.

The example illustrates a star schema generator implemented using a scripting language, for example, AWK. However, other programming languages can be used to implement the star schema generator.

Table 1 below illustrates an Excel sheet report, from which a star schema is to be extracted.

TABLE 1

| Per Name Month | Office | Order Type | Organization | Order Number | Company | Revenue |
|---|---|---|---|---|---|---|
| 2008/01 | River Office | Secure | Production Org. | 18879 | Acme G | 3,151 |
| 2008/02 | Eiffel Office | Secure | Subsidiaries Org. | 3912 | Acme T | 4,133 |
| 2008/03 | Foster Office | Standard | Inbound Org. | 11035 | Acme S | 439 |
| | Madison Office | Express | International Org. | 14080 | Acme S. | 959 |
| | Sherman Office | Standard | International Org. | 14839 | Acme S | 3800 |
| | Perry Office | Secure | Subsidiaries Org. | 10560 | Acme T | 1568 |
| | Guadalupe Office | Standard | Production Org. | 14436 | Acme G | 1962 |
| | Figueroa Office | Secure | Production Org. | 2740 | Acme G | 2652 |

TABLE 1-continued

| Per Name Month | Office | Order Type | Organization | Order Number | Company | Revenue |
|---|---|---|---|---|---|---|
| | Copper Office | Secure | Subcontracted Org. | 15467 | Acme G | 1934 |
| 2008/04 | Blue Bell Office | Secure | Inbound Org. | 7164 | Acme S | 2198 |
| | Foster Office | Secure | Inbound Org. | 11064 | Acme S | 2510 |
| | Madison Office | Secure | International Org. | 16683 | Acme S | 2549 |
| | Eiffel Office | Secure | Subsidiaries Org. | 16473 | Acme T | 3721 |
| | Mills Office | Standard | Franchises Org. | 8680 | Acme T | 959 |
| | Morange Office | Secure | Subcontracted Org. | 13746 | Acme G | 3163 |
| | Figueroa Office | Secure | Production Org. | 2740 | Acme G | −40 |

Table 2 below illustrates a matrix of correlation indicators for each pair of columns, indicating whether each unique value appearing in multiple rows in one column of a column pair consistently corresponds to the same value in another column of the column pair.

TABLE 2

| | Per Name Month (t1) | Office (t2) | Order Type (t3) | Organization (t4) | Order Number (n5) | Company (t6) | Revenue (n7) |
|---|---|---|---|---|---|---|---|
| Per Name Month(t1) | 0 | 1 | 1 | 1 | 1 | 1 | 1 |
| Office(t2) | 1 | 0 | 1 | 0 | 1 | 0 | 1 |
| Order Type (t3) | 1 | 1 | 0 | 1 | 1 | 1 | 1 |
| Organization(t4) | 1 | 1 | 1 | 0 | 1 | 0 | 1 |
| Order Number(n5) | 1 | 0 | 0 | 0 | 0 | 0 | 1 |
| Company(t6) | 1 | 1 | 1 | 1 | 1 | 0 | 1 |
| Revenue(n7) | 1 | 1 | 1 | 1 | 1 | 1 | 0 |

In Table 2 as shown above, the letter and number in parentheses is the column type and number (e.g., t2—column 2 is of text type; n5—column 5 is of numeric type).

As shown by Table 2, each of the '0's indicates that each unique value appearing in multiple rows in a first column of a column pair consistently corresponds to a same value in a second column of the column pair, while each of the indicates that each unique value appearing in multiple rows in a first column of a column pair does not consistently corresponds to a same value in a second column of the column pair.

As an illustrative example, for the column pair "Office" (Column 2) and "Organization" column (Column 4), each unique value appearing in multiple rows in Column 2 consistently corresponds to same value in Column 4.

For example, "Foster Office" in Column 2 of the Excel sheet always appears in Rows 2 and 11, and the value in each row consistently corresponds to the same value "Inbound Org." Similarly, "Madison Office" appears in Columns 3 and 12, and the value appearing in the multiple rows consistently corresponds to the same value "International Org." in column 4. As shown in Table 2, this relationship from the perspective of Column 2 is represented by an indictor '0'.

From the perspective of Column 4, it is not true that each value appearing in multiple rows consistently corresponds to the same value in Column 2. As shown above, the value "International Org." appearing Rows 4 and 5 corresponds to different values (i.e. "Madison Office" and "Sherman Office"). As such, the relationship between Columns 4 and 2 from the perspective of Column 4 is indicated by '1'.

Based on the matrix of correlation indicators shown in Table 2, the system can determine a relationship between each pair of column in accordance with the following rules:

1) Columns i and j have a many-to-many relationship (i.e. no relationship) if no unique value appearing in multiple rows in a first column of a column pair consistently corresponds to a same value in a second column of the column pair;
2) Columns i and j have a many-to-one relationship from the perspective of Column i if each unique value appearing in multiple rows in Column i consistently corresponds to a same value in Column j, while if each unique value appearing in multiple rows in Column j does not consistently correspond to a same value in Column i;
3) Columns i and j have a one-to-many relationship from the perspective of Column i if each unique value appearing in multiple rows in Column 1 does not consistently correspond to a same value in Column j, while if each unique value appearing in multiple rows in Column j consistently correspond to a same value in Column j; and
4) Columns i and j have a one-to-one relationship if each unique value appearing in multiple rows in one column in the column pair consistently corresponds to a same value in the other column of the column pair.

Based on the above rules, it can be determined that there is no relationship between Columns 2 and 3 (i.e., "Office" and "Order Type" Columns), and there is a many-to-one relationship between Columns 2 and 4 (i.e. "Office" and "Organization" columns) from the perspective of Column 2, and a one-to-many relationship between the column pair from the perspective of Column 4.

Identifying Cube Elements

The system can identify, from a plurality of columns in an Excel sheet, a plurality of cube elements for use in constructing a star schema for use in a multidimensional database.

To identify the plurality of cube elements, the system can perform a heuristic process as described below.

First, the system can identify one or more measure columns and one or more flat hierarchy dimension columns from the plurality of columns. A measure column is a numeric or float column that does not have a relationship with any of the plurality of columns. A flat hierarchy dimension column is a text column that does not have a relationship with any other column, or a numeric or text column that has a one-to-many or many-to-one relationship with all other columns.

In this particular example, Columns 1 and 7 ("Per Name Month" and "Revenue" Columns) has a many-to-many relationships with each of the other columns. Since Column 1 is a text (date) Column, Column 1 cannot be a measure column, the system can identify or classify Column 1 as a flat hierarchy dimension column. Since Column 7 is a numeric column, the system can identify or classify the column as a measure column.

Next, the system can consider only the remaining 5 columns (i.e. Column 2, 3, 4 and 5 and 6) for a dimension hierarchy. Since each of Columns 2, 3, 4, and 6 has a many-to-one relationship with Column 5, indicating that the 5 columns belong to one dimension, and that Column 5 is the base-level column.

The system can subsequently identify a dimension hierarchy and attributes from the 5 columns. As described above, to identify a dimension hierarchy, the system can first identify one or more top-level columns. Each top-level column has only a one-to-many or one-to-one relationship with other columns in the set of columns belonging to the dimension.

If more than one top-level columns has been identified, the system can select a column that can be used to build a highest hierarchy for the dimension as the top-level column.

In this particular example, Columns 3 and 6 can be identified as top-level columns, since each column has only a one-to-to many or one-to-one relationship with each of Columns 2, 4 and 5. The system can select Column 6 as the top-level column in building a dimension hierarchy, since Column 6 can be used to build a higher dimension hierarchy than Column 3. Column 3 has a one-to-many relationship only with Column 5 (the base-level column), while Column 6 has a one-to-many relationships with Columns 2, 4, and 5. A dimension hierarchy built using Column 3 as the top-level column can include Column 5 and Column 3, while a dimension hierarchy built using Column 6 can include Column 5, 2, 4 and 6.

After identifying the base-level column and the top-level column for the dimension hierarchy, the system can identify one or more intermediate level columns for the dimension hierarchy. An intermediate level column has a relationship with the base-level column, and a many-to-one relationship with the top-level column.

In this particular example, since each of Columns 2 and 4 has a many-to-one relationship with the selected top-level column (i.e. Column 6), and a one-to-many relationship with the base-level column (i.e. Column 5), both Columns 2 and 4 can be identified as intermediate level columns for the dimension hierarchy.

In accordance with an embodiment, the system can use the identified measures column and the dimension hierarchy to construct a star schema as shown below in Listing 1:

Listing 1

```
Cube {
  Dimension1{
    generation 1 Column Order Number(n5) attribute Order Type(t3)
    generation 2 Column Office(t2)
    generation 3 Column Organization(t4)
    generation 4 Column Company(t6)
  }
  Dimension2 {
    generation 1 Column Per Name Month(t1)
  }
  Measure {
    Measure Revenue(n7)
  }
}
```

As shown above in Listing 1, the other identified top-level column (i.e. Column 3) that has not been selected for building the dimension hierarchy is identified as an attribute of the base-level column.

Alternatively, Column 3 and/or any other columns that do not fit into the dimension hierarchy can be used to construct an alternative dimension hierarchy.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for generating a star schema for use in a multidimensional database from a tabular data comprising a plurality of columns, the method comprising:

determining a correlation relationship between each pair of the plurality of columns of the tabular data by analyzing actual values in a plurality of rows of said the tabular data in said each pair of columns;

identifying one or more measure columns from the plurality of columns, based on said analyzing actual values in the plurality of rows of said tabular data in said each pair of columns;

removing the one or more identified measure columns from the plurality of columns;

creating one or more dimension hierarchies from the remaining columns of the plurality of columns; and constructing a star schema for building a cube in the multidimensional database using the one or more identified measure columns, and the one or more dimension hierarchies.

2. The method of claim 1, further comprising:

identifying one or more flat hierarchy dimension columns from the plurality of columns based on the type of each column and the relationship that said each column has with each other column, and removing the one or more flat hierarchy dimension columns from the plurality of columns.

3. The method of claim 1, wherein determining a correlation relationship between each pair of the plurality of columns comprises:

for each pair of columns comprising a first column and a second column in the tabular data, determining whether each unique value appearing in multiple rows in the first column consistently corresponds to a same value in the second column, and whether each unique value appearing in multiple rows in the second column consistently corresponds to a same value in the first column.

4. The method of claim 1, wherein determining a correlation relationship between each pair of the plurality of columns comprises:

determining a correlation relationship between a first column and a second column in said each pair of columns based on whether each unique value appearing in the particular rows in the first column consistently corresponds to a same value in the second column.

5. The method of claim 1, wherein identifying the one or more dimension hierarchies comprises:

identifying a base-level column, wherein the base-level column has a many-to-one relationship with each other column in a set of columns.

6. The method of claim 1, wherein identifying one or more dimension hierarchies comprises:

identifying a base-level column, wherein the base-level column has a many-to-one relationship with each other column in a set of columns; and identifying a top-level column, wherein the top-level column has only a one-to-many or one-to-one relationship with each other column in the set of columns.

7. The method of claim 1, wherein identifying one or more dimension hierarchies comprises:

identifying a base-level column, wherein the base-level column has a many-to-one relationship with each other column in a set of columns;

identifying a plurality of top-level columns, wherein each top-level column has only a one-to-many or one-to-one relationship with each other column in the set of columns; and, selecting, from the plurality of identified top-level columns, a column used to build a highest hierarchy for each dimension.

8. The method of claim 1, further comprising:

receiving the tabular data, and performing one or more of filling missing values, handling exceptions in cell values, checking statistics/properties on columns in the tabular data, and determining types of columns.

9. The method of claim 1, further comprising:

identifying one or more potential problems associated with the star schema;

displaying the identified one or more potential problems associated with the star schema at a user interface;

providing, via the user interface, a list of alternative star schema construction models; and receiving user input, via the user interface, selecting an alternative stare schema construction model from the list of alternative star schema construction models.

10. The method of claim 1, further comprising:

identifying one or more potential problems associated with the star schema;

displaying the identified one or more potential problems associated with the star schema at a user interface;

providing, via the user interface, a list of alternative star schema construction models each having corresponding component in the multidimensional database;

receiving user input, via the user interface, selecting an alternative star schema construction model from the list of alternative star schema construction models; and invoking a heuristic cube element identification process to implement the selected alternative star schema construction method.

11. A system for extracting a star schema from a tabular data comprising a plurality of columns for use in a multidimensional database, the system comprising:

a computer that includes one or more microprocessors;

a multidimensional database server executing on the computer;

a star schema generator operating as a client to the multidimensional database server, wherein the star schema generator is configured to:

determine a correlation relationship between each pair of the plurality of columns of the tabular data by analyzing actual values in a plurality of rows of said the tabular data in said each pair of columns;

identify one or more measure columns from the plurality of columns, based on said analyzing actual values in the plurality of rows of said tabular data in said each pair of columns;

remove the one or more identified measure columns from the plurality of columns;

create one or more dimension hierarchies from the remaining columns of the plurality of columns; and construct a star schema for building a cube in the multidimensional database using the one or more identified measure columns, and the one or more dimension hierarchies.

12. The system of claim 11, where the star schema generator is further configured to:

identify one or more flat hierarchy dimension columns from the plurality of columns based on the type of each column and the relationship that said each column has with each other column, and remove the one or more flat hierarchy dimension columns from the plurality of columns.

13. The system of claim 11, where the star schema generator is configured to determine a correlation relationship between each pair of the plurality of columns by:

for each pair of columns comprising a first column and a second column in the tabular data, determining whether each unique value appearing in multiple rows in the first column consistently corresponds to a same value in the second column, and whether each unique value appearing in multiple rows in the second column consistently corresponds to a same value in the first column.

14. The system of claim 11, where the star schema generator is configured to determine a correlation relationship between each pair of the plurality of columns by:
determining a correlation relationship between a first column and a second column in said each pair of columns based on whether each unique value appearing in the particular rows in the first column consistently corresponds to a same value in the second column.

15. The system of claim 11, where the star schema generator is configured to identify the one or more dimension hierarchies by:
identifying a base-level column, wherein the base-level column has a many-to-one relationship with each other column in a set of columns.

16. The system of claim 11, where the star schema generator is configured to identify the one or more dimension hierarchies by:
identifying a base-level column, wherein the base-level column has a many-to-one relationship with each other column in a set of columns; and
identifying a top-level column, wherein the top-level column has only a one-to-many or one-to-one relationship with each other column in the set of columns.

17. The system of claim 11, where the star schema generator is configured to identify the one or more dimension hierarchies by:
identifying a base-level column, wherein the base-level column has a many-to-one relationship with each other column in a set of columns;
identifying a plurality of top-level columns, wherein each top-level column has only a one-to-many or one-to-one relationship with each other column in the set of columns; and,
selecting, from the plurality of identified top-level columns, a column used to build a highest hierarchy for each dimension.

18. The system of claim 11, further comprising a user interface wherein the user interface is configured to:
display one or more identified potential problems associated with the star schema;
providing list of alternative star schema construction models; and
receive user input selecting an alternative stare schema construction model from the list of alternative star schema construction models.

19. The system of claim 11, further comprising a user interface wherein the user interface is configured to:
display one or more identified potential problems associated with the star schema;
providing list of alternative star schema construction models each having corresponding component in the multidimensional database; and
receive user input selecting an alternative stare schema construction model from the list of alternative star schema construction models; and
invoke a heuristic cube element identification process to implement the selected alternative star schema construction method.

20. A non-transitory computer readable storage medium, including instructions stored thereon for supporting extracting a star schema from a tabular data comprising a plurality of columns using a star schema generator executing on one or more microprocessors, for use in a multidimensional database, which instructions, when read and executed on said one or more microprocessors cause the one or more microprocessors to perform steps comprising:
determining a correlation relationship between each pair of the plurality of columns of the tabular data by analyzing actual values in a plurality of rows of said the tabular data in said each pair of columns;
identifying one or more measure columns from the plurality of columns, based on said analyzing actual values in the plurality of rows of said tabular data in said each pair of columns;
removing the one or more identified measure columns from the plurality of columns;
creating one or more dimension hierarchies from the remaining columns of the plurality of columns; and
constructing a star schema for building a cube in the multidimensional database using the one or more identified measure columns, and the one or more dimension hierarchies.

* * * * *

UNITED STATES PATENT AND TRADEMARK OFFICE
CERTIFICATE OF CORRECTION

PATENT NO. : 11,392,558 B2
APPLICATION NO. : 16/907962
DATED : July 19, 2022
INVENTOR(S) : Shaked Page 1 of 1

It is certified that error appears in the above-identified patent and that said Letters Patent is hereby corrected as shown below:

On the Title Page

On page 2, Column 2, item [56] under Other Publications, Line 3, delete "Ankovszky," and insert -- Iankovszky, --, therefor.

On page 2, Column 2, item [56] under Other Publications, Line 39, delete "retreived" and insert -- retrieved --, therefor.

In the Drawings

On sheet 6 of 7, in Figure 5, under Reference Numeral 517, Lines 2-3, delete "that that" and insert -- that --, therefor.

In the Specification

In Column 8, Line 4, delete "by" and insert -- By --, therefor.

In Column 8, Line 15, delete ""Id"" and insert -- "Id" --, therefor.

In Column 14, Line 4, delete "that that" and insert -- that --, therefor.

In the Claims

In Column 20, Line 16, in Claim 9, delete "stare" and -- star --, therefor.

In Column 22, Line 5, in Claim 18, delete "stare" and -- star --, therefor.

In Column 22, Line 16, in Claim 19, delete "stare" and -- star --, therefor.

Signed and Sealed this
Twenty-seventh Day of December, 2022

Katherine Kelly Vidal
*Director of the United States Patent and Trademark Office*